United States Patent [19]

Jones et al.

[11] 3,888,999

[45] June 10, 1975

[54] COFFEE PERCOLATOR PACKAGES AND METHOD

[75] Inventors: Gary V. Jones, Ramsey, N.J.; John A. Pereira, Pearl River, N.Y.; Warren C. Rehman, Montvale, N.J.

[73] Assignee: General Foods Corporation, White Plains, N.Y.

[22] Filed: May 30, 1973

[21] Appl. No.: 365,305

[52] U.S. Cl. .................. 426/77; 99/295; 206/.5; 426/394; 426/433; 426/454
[51] Int. Cl. .................. B65d 85/70; A23f 1/08
[58] Field of Search .................. 426/77–84, 426/433, 394, 454; 99/295; 206/.5

[56] References Cited
UNITED STATES PATENTS
3,511,666  5/1970  Hudson et al.................. 426/454 X

OTHER PUBLICATIONS

"Hackh's Chemical Dictionary," by J. Grant, published by The Blakiston Company, 3rd edition, printed 1950, pages 147.

Primary Examiner—Frank W. Lutter
Assistant Examiner—Neil F. Greenblum
Attorney, Agent, or Firm—Bruno P. Struzzi; Thomas V. Sullivan; Thomas R. Savoie

[57] ABSTRACT

Roasted and ground coffee is compressed to form a tablet. This tablet is then enclosed and sealed within porous filter material, the seal being discontinuous, containing at least one unsealed portion through which a small amount of coffee particles may pass during percolation. These coffee particles act as boiling sites within the percolator and reduce or eliminate superheating.

4 Claims, No Drawings

COFFEE PERCOLATOR PACKAGES AND METHOD

BACKGROUND OF THE INVENTION

This invention is related to commonly-assigned U.S. Pat. Nos. 3,511,666 and 3,691,718 respectively entitled "Method Of Making A Pelletized Coffee Brewing Package" and "Pouch Forming Apparatus And Method" both of which are hereby incorporated by reference. This invention is also related to concurrently-filed, commonly-assigned application Ser. No. 365,306 by Cante, et al., which discloses the use of organosiliconoxide polymers to counteract the effects of any anionic or non-ionic surface active agents which may be present in the brew, which agents also act to promote superheating.

This invention is concerned with coffee percolator packages containing one or more tablets of coffee and which is designed for use in a home-type percolator. The percolator package contains a measured amount of roasted and ground coffee, in compressed tablet form, and enclosed in a pouch of heat-sealable filter material having a porosity which permits ready extraction of coffee solids, while confining almost all the coffee grounds within the package for easy discard thereof after use.

The preferred form for the percolator package of this invention is that of a circular ring in which an annular tablet of compressed coffee is enclosed within an annular pocket of filter material. This circular shape is desirable because of the use to which pouch will be put, i.e. placed in the percolator basket of a household electric or stove top percolator. The formation of an annular pocket normally requires that upper and lower plies of filter wrapping material be joined together both in a seal extending around the inner circumference of the annular article (i.e. inner seal) and in a seal around the outer circumference of the annular article (i.e. outer seal).

Equipment capable of forming such circular percolator packages from a continuous web of heat sealable wrapping material and a continuous feed stream of compressed annular tablets is fully described in aforementioned U.S. Pat. No. 3,691,718. Methods and means for forming the compressed coffee tablets is fully described in aforementioned U.S. Pat. No. 3,511,666 where it is also noted that the coffee tablet should be packaged in a manner which assures void space inside the filter material, in order to provide for proper circulation of the water through the bed of coffee during percolation. If less than 30 percent void space is present within the filter wrapping, the tablets on wetting will swell into a compact bed which may not allow proper extraction of coffee solids. In extreme cases, the bag itself may rupture since the coffee particles swell to about twice their size.

SUMMARY

It has been found that when brewing coffee percolator packages, such as those described above, a clear, sediment-free brew is produced in the percolator. It has been discovered, however, that a complete absence of sediment can lead to superheating occurring within the percolator. This superheating phenomena may be evidenced by "bumping" of the liquid rather than normal boiling. This problem has been found to be most common in glass or ceramic stovetop percolators, especially under the influence of high heat inputs. Coarser filter material which would permit coffee grounds to pass into the brew during percolation is not a satisfactory answer to the problem since it has been found to be difficult to regulate with the required degree of consistency the amount of sediment which will end up in the brew. Filter material which is coarse enough to permit passage of grounds during percolation will also permit coffee particles to pass through the filter material prior to use by the consumer. Product appearance is greatly lessened if the consumer is confronted with coffee particles or dust on the percolator package or in the package container (e.g. metal can). This problem is particularly apparent when, as a result of shipping and handling, the compressed tablets within the filter material become fragmented thereby generating fine material which can pass through the filter wrapper.

Coating a coarse filter material with a water-soluble film, such as described in U.S. Pat. No. 3,373,043, which film will retain all of the coffee within the package until dissolved, has been found to produce an undesirable taste or mouthfeel in the brewed coffee beverage. Such techniques are not seen as being commercially acceptable at the current state of the art.

According to this invention the coffee percolator package is prepared in such a manner that the filter wrapping material is incompletely sealed at at least one location. The incompletely sealed area, which can be characterized as an interruption in the seal, must of course form a passageway or communication between the interior and exterior of the percolator package. During percolation of the package and as the compressed coffee tablet breaks and expands, a small amount of coffee particles will pass out of the filter wrapper through the unsealed area. The incompletely sealed location refers to either a complete absence of sealing or a seal which is so weak that it is broken during percolation such as by breaking as a result of the stress applied to the area when the coffee tablet expands.

The fact that the compressed tablet is not tightly enclosed within the filter material permits the use of unsealed areas while minimizing the amount of coffee that may pass out of the package before percolation. This results from the fact that the sealed areas of the percolator package, usually around the periphery of the package, are spaced apart from the compressed coffee tablet. It is not until the tablet expands and breaks apart that coffee particles are forced out to and through the unsealed areas.

It may be desirable to combine the organosiliconoxide polymer invention of the aforementioned application, Ser. No. 365,306 with the interrupted heat seal invention of this application in order to produce a percolator package that will further reduce or minimize the incidence of superheating.

DETAILED DESCRIPTION OF THE INVENTION

U.S. Pat. No. 3,511,666 describes the characteristics of the preferred percolator packages of this invention. More particularly annular-shaped coffee tablets are formed from ground and degassed roasted coffee by compressing the coffee particles under sufficient pressure and for sufficient time to form a self-sustaining tablet which is capable of releasing at least 10 percent more extractable solids than an equivalent weight of uncompressed roasted and ground coffee. In effecting this compression, normally at a pressure between 8,000 and 13,000 p.s.i., the initial volume of coffee is reduced to between 25 and 40 percent, preferably 30 to 35 percent, of the initial charge volume; however, the coffee particles should not be disrupted to the extent that sufficient coffee lipids are expressed to stain the filter wrapping material or produce an undesirable oil film or slick in the percolated brew.

The filter material used to enclose or wrap the compressed tablet can be of any non-toxic, relatively tasteless or bland substantially insoluble material. The porosity of the filter material must be great enough to allow substantial extraction of the coffee. Such a porosity would normally permit substantial migration or dusting of coffee particles through the pores of the bag; however, tabletting of the coffee prevents this from occurring. The porosity should be small enough, however, to prevent migration of the swollen roasted coffee particles during percolation. Normally this will require perforations having a diameter of 0.01 to 0.1 inch, preferably 0.03 to 0.07 inch. Roughly the porosity of the bag will conform to between an 8 and 60 U.S. mesh screen, preferably between 11 and 20 mesh. The percent open area can range from 10 to 90 percent. Any natural or synthetic material, or combination thereof which meets the above specifications can be used. Preferably the material is heat sealable, at least at the portions which will be sealed to enclose the tablet. The use of heat sealable binders and/or the use of heat sealable fibers or films (e.g. polyethylene, polypropylene, etc.) is contemplated.

In the case of circular shaped percolator package the filter material should form an intimate contact with the percolator spout. This can be done by providing only a small hole or slit at the center of the percolator package. This center area may be an unsealed area and it is this slit or hole through which the particles of coffee can pass during percolation. This assures a trapping of the percolating water issuing from the top of the spout and avoids serious bypass of the coffee. The inner seal should be about ½ to ¾ inch in diameter; roughly 1.5 to 2.5 inches in circumference.

The incompletely sealed segments of the percolator packages should not be too great in either size or number so that the amount of coffee particles passing out of the filter package during percolation is not excessive. Preferably the unsealed portions which are present during percolation should not be greater than about 0.5 inch; preferably about 0.2 to 0.5 inch, in linear length. The number of these unsealed portions will usually be about 1 to 4.

It has been found that for circular (e.g. annular) shaped percolator packages it is preferable to incorporate the incompletely sealed portions of the heat seal within the inner seal. The outer seal of the package is less preferred since, depending on the diameter of the percolator basket, the outer sealed area may become constricted and/or folded when the package is inserted into the percolator basket.

This invention is further illustrated but not limited by the following examples.

EXAMPLE I

Annular-shaped coffee tablets were made from fresh roasted, ground and degassed coffee by tabletting the coffee at a rate of 400 tablets per minute in Stokes (Model 340), 15 station, dual feed, rotary press operating at a pressure of about 11,000 p.s.i.g. Each tablet contained about 1.2 ounces of coffee and had internal and external diameters of 1.24 and 2.83 inches respectively. The tablets were then wrapped in a non-woven fabric made of mixed polymeric fibers with a coating of non-toxic, bland resin binder. The fiber portion was 91 percent viscose rayon fibers and 9 percent polypropylene fibers. The porosity of the fabric had hole sizes of about 0.03 inch and roughly corresponded to a 16 U.S. mesh screen. This fabric was supplied in roll form which is cut to 5½ by 10½ inch blanks which are folded over and heat sealed around the inside and outside of the annular tablet, as described in U.S. Pat. No. 3,691,718. The fabric was sealed in such a manner so as to provide about 0.5 inch space for the coffee to expand toward both the inner and outer seal. Excess fabric was trimmed to give an annular percolator package having outside and inside diameter of 4.5 and 0.75 inches respectively.

EXAMPLE II

Percolator packages were prepared in accordance with Example I. The sole distinguishing feature being that the inner heat seal was interrupted by two, diametric unsealed portions each ⅜ inch in linear length. The interruptions in the heat seal were made by slotting the upper and lower heat sealing members which in this case are respectively a heated metal die and an annular silicone rubber platen.

The percolator packages of Examples I and II were compared as to the incidence of superheating by placing the respective percolator packages (two each) into the baskets of identical, ceramic, stove-top coffee percolators which had all been thoroughly washed, rinsed and dried. Coffee beverages were prepared using a brewing cycle which employed moderate heat. After brewing, the percolators were then subjected to a high heat input and it was noted that the incidence of observable superheating was significantly less with the percolator packages of Example II.

Having thus described the invention what is claimed is:

1. In a process for making a circular percolator package for use in brewing coffee which comprises degassing roasted and ground coffee, compressing said coffee at a pressure between 8,000 and 13,000 p.s.i. for a sufficient period of time to form a self-sustaining, annular tablet which is capable of releasing at least 10 percent more extractable solids than an equivalent charge of uncompressed coffee but insufficient to express undesirable lipids, and enclosing said annular tablet in a porous filter material by means of an inner seal extending around and spaced apart from the inner circumference of the annular tablet and an outer seal extending around and spaced apart from the outer circumference of the annular tablet, said material having a pore size between 0.01 and 0.1 inch and said enclosure having a volumetric capacity at least 30 percent greater than the volume of the enclosed coffee tablet, the improvement comprising forming at least one incompletely sealed area in the inner or outer seals, the incompletely sealed area forming a passageway between the interior and exterior of the percolator package.

2. The method of claim 1 wherein the sealing is accomplished by heat sealing.

3. The method of claim 2 wherein the inner seal contains an incompletely sealed area.

4. An annular shaped percolator package comprising a compressed annular shaped coffee tablet enclosed within a filter material by means of an inner heat seal extending around and spaced apart from the inner circumference of the annular tablet and an outer heat seal extending around and spaced apart from the outer circumference of the annular tablet, said inner seal being incomplete in at least one location, the incompletely sealed area forming a passageway between the interior and the exterior of the percolator package.

* * * * *